US006384335B1

(12) United States Patent
Saito et al.

(10) Patent No.: US 6,384,335 B1
(45) Date of Patent: May 7, 2002

(54) SHIELDING TERMINAL AND METHOD FOR CONNECTING A SHIELDING TERMINAL

(75) Inventors: Masashi Saito; Takashi Koide; Masahiko Aoyama, all of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/566,522

(22) Filed: May 8, 2000

(30) Foreign Application Priority Data

Jul. 5, 1999 (JP) ........................................ 11-127439

(51) Int. Cl.[7] ........................................ H02G 15/02
(52) U.S. Cl. ........................ 174/74 R; 174/78; 439/585
(58) Field of Search ............................ 174/21 C, 84 R, 174/84 C, 74 R, 75 C, 78; 439/585

(56) References Cited

U.S. PATENT DOCUMENTS 4,986,779 A * 1/1991 Ferrill et al. ................ 439/108
5,169,340 A 12/1992 Nakata et al. .............. 439/607
5,312,273 A * 5/1994 Andre et al. ................ 439/607
5,529,506 A * 6/1996 Onoda ......................... 439/95
5,580,268 A 12/1996 Miyazawa .................. 439/352
5,791,943 A * 8/1998 Lo et al. ...................... 439/676
5,975,950 A * 11/1999 Yamaguchi ................. 439/585
6,171,150 B1 * 1/2001 Saito et al. ................. 439/610

* cited by examiner

*Primary Examiner*—Dean A. Reichard
*Assistant Examiner*—William H. Mayo, III
(74) *Attorney, Agent, or Firm*—Anthony J. Casella; Gerald E. Hespos

(57) ABSTRACT

A shielding terminal includes an inner terminal 11 to be connected with a core 2, an outer terminal 12 to be connected with a braided wire 4, a dielectric element 13 for insulating the two terminals 11 and 12 from each other, and a cover 14 to be mounted on an upper portion of the outer terminal 12. After the core 2 is fastened to an inner fastening portion 18 of the inner terminal 11 outside the outer terminal 12, the inner terminal 11 is inserted into the dielectric element 13. An outer fastening portion 22 of the outer terminal 12 is crimped into connection with a section 4A of the braided wire 4 folded back around an end of a sheath 5. In the center of the outer terminal 12, the upper surface is opened to provide an open space 21A. The fastened portion of the core 2 is covered on four sides by mounting the cover 14 to cover the open space 21A.

11 Claims, 11 Drawing Sheets

SHIELDING TERMINAL AND METHOD FOR CONNECTING A SHIELDING TERMINAL

BACKGROUND OF THE INVENTION

1. Field of the Invention

The present invention relates to a shielding terminal to be connected with an end of a shielded cable and to a method for connecting a shielding terminal with an end of a shielded cable.

2. Description of the Related Art

A known shielding terminal is shown in FIGS. 18 and 19. The known shielding terminal comprises an inner terminal "a" to be connected with a mating terminal, a dielectric element "b" for accommodating the inner terminal "a", and an outer terminal "c" in the form of a rectangular tube for accommodating the dielectric element "b". The inner terminal "a" includes a core-fastening portion "h" that is crimped into connection with an end of a core "e" of a shielded cable "d". The outer terminal includes a braided wire fastening portion "i" and a sheath fastening portion "j" that are crimped into connection with an end of a braided wire "f" and an end of a sheath "g", respectively.

A terminal mounting apparatus is employed for simultaneously connecting the core "e", the braided wire "f" and the sheath "g". The apparatus requires windows "k" to be formed in the upper and lower surfaces of the outer terminal "c" so that the apparatus can access and crimp the core fastening portion "h" of the inner terminal "a" that is accommodated in the outer terminal "c". The requirement for windows means that the portion of the shielding terminal that is fastened to the core "e" has its upper and lower surfaces exposed through the windows "k". As a result, shielding characteristics, such as a radiation characteristic, are undesirably reduced.

In view of the above problem, an object of the present invention is to provide a shielding terminal and a connection method for improving shielding characteristics.

SUMMARY OF THE INVENTION

The subject invention is directed to a shielding terminal for connection with an end of a shielded cable. The cable comprises a core provided substantially in the center of the cable. An insulating layer surrounds the core, and a shield layer, preferably a braided wire, coaxially surrounds the insulating layer. A sheath then surrounds the braided wire.

The shielding terminal comprises an inner terminal to be connected with the core, and a dielectric element for at least partly accommodating the inner terminal. An outer terminal at least partly accommodates the dielectric element and can be connected with the shield layer or braided wire. The shielding terminal further comprises a cover having a covering portion for substantially covering an open space around a section of the inner terminal connected with the core, and at least one mount portion mountable on a section of the outer terminal that can be connected with the shield layer or braided wire. At least one assembling piece is arranged substantially along a sidewall of the outer terminal, and is formed with at least one displacement-restricting portion for restricting a displacement of the cover.

The cover covers the open space that exists around sections of the inner terminal that are fastened to the core. As a result, shielding characteristics, such as a radiation characteristic, can be improved. The cover is mountable on the connected section of the outer terminal. Consequently, the shielding terminal can be simplified, and does not require a separate mounting structure. Further, the displacement-restricting portion restricts displacement of the cover.

According to a preferred embodiment of the invention, the assembling piece extends from the covering portion of the cover.

Preferably, the displacement-restricting portion restricts displacement of the cover by being held substantially in contact with a connecting wall that connects the sidewalls of the outer terminal. The connecting wall preferably is a bottom wall of the outer terminal. Accordingly, downward displacement of the cover inside the outer terminal can be restricted.

Each displacement-restricting portion preferably comprises a first displacement-restricting portion that is held in contact with the sidewall of the outer terminal and a second displacement-restricting portion that is held in contact with the connecting wall.

The displacement-restricting portion preferably is inserted between the sidewall of the outer terminal and a sidewall of the dielectric element. Thus the displacement restricting portion prevents the assembling piece from being bent inward of the outer terminal.

The displacement-restricting portion prevents the assembling piece from being bent inward of the outer terminal by being inserted between the sidewall of the outer terminal and a sidewall of the dielectric element. Accordingly, the displacement restricting portion prevents the assembling piece from being bent inward of the outer terminal.

Most preferably, the mount portions comprise a clip-lock construction.

According to the invention, there is further provided a method for connecting a shielding terminal with an end of a shielded cable. The shielded cable comprises a core substantially in the center of the cable. An insulating layer surrounds the core, a shield layer coaxially surrounds the insulating layer, and a sheath surrounds the shield layer. The method comprises connecting an inner terminal with the core and at least partly accommodating the inner terminal in a dielectric element. The method continues by at least partly accommodating the dielectric element in an outer terminal and connecting the outer terminal with the shield layer. The method then includes substantially covering an open space around a section of the inner terminal connected with the core by means of a cover having a covering portion. The covering step comprises mounting at least one mount portion of the cover on a section of the outer terminal that is connected with the shield layer, and arranging at least one assembling piece substantially along a sidewall of the outer terminal for restricting a displacement of the cover.

According to a preferred embodiment of the invention, the covering step further comprises bringing at least one displacement-restricting portion into contact with a connecting wall that connects the side walls of the outer terminal. The connecting wall preferably is a bottom wall of the outer terminal.

These and other objects, features and advantages of the present invention will become more apparent upon a reading of the following detailed description and accompanying drawings.

DETAILED DESCRIPTION OF THE PREFERRED EMBODIMENTS

A male shielding terminal in accordance with the invention is identified by the numeral 10 in FIGS. 12 to 17, and is mounted on one end of a shielded cable 1. In the following description, a side of the shielding terminal 10 that is to be connected with a mating terminal fitting (not shown) is referred to as a front or leading side. Additionally, with reference to FIG. 2, the upper side preferably is the side where a cover 14 is to be arranged while the lower side preferably is a substantially closed side.

Figure 1:
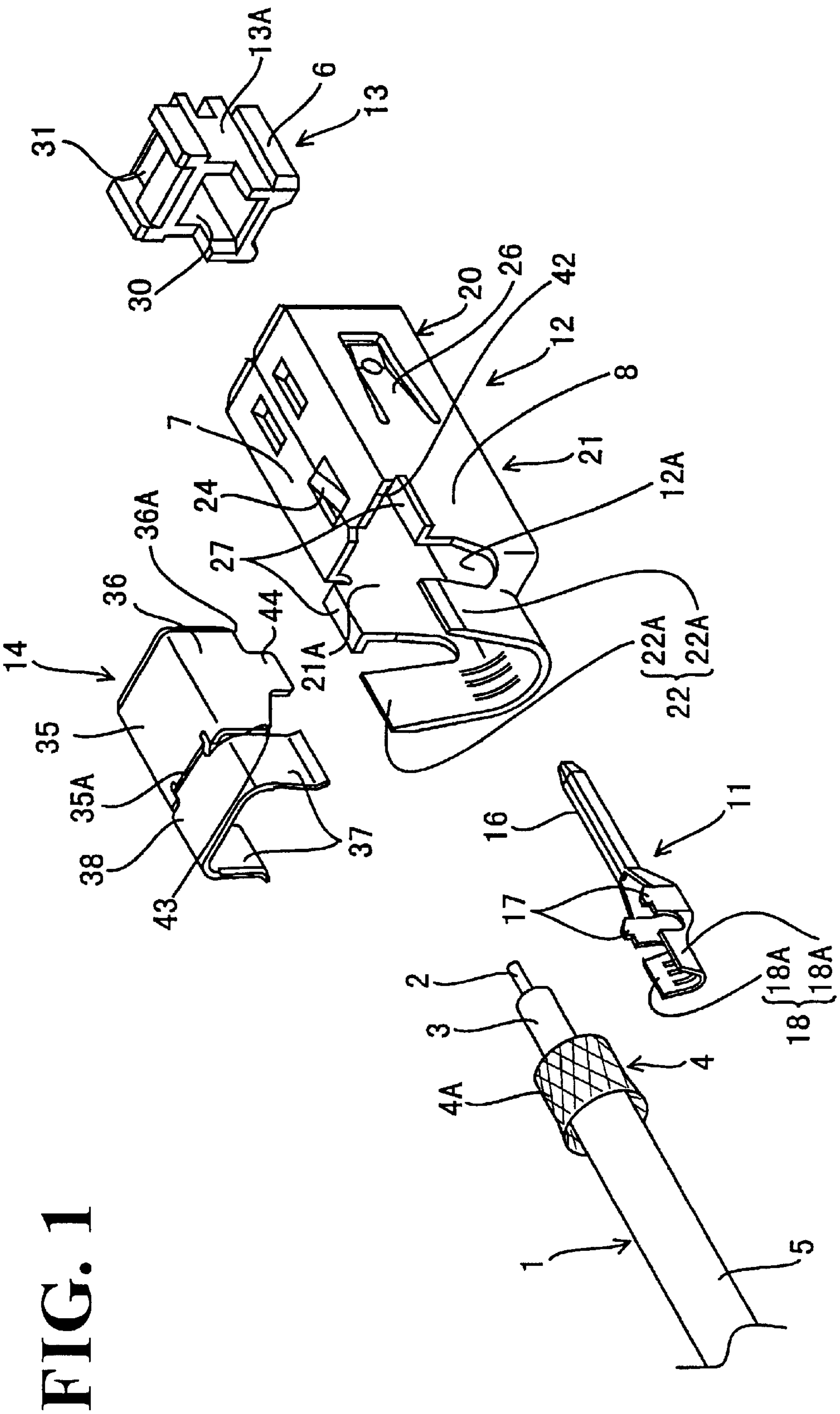
FIG. 1 is an exploded perspective view of a shielding terminal according to one embodiment of the invention.
Figure 2:
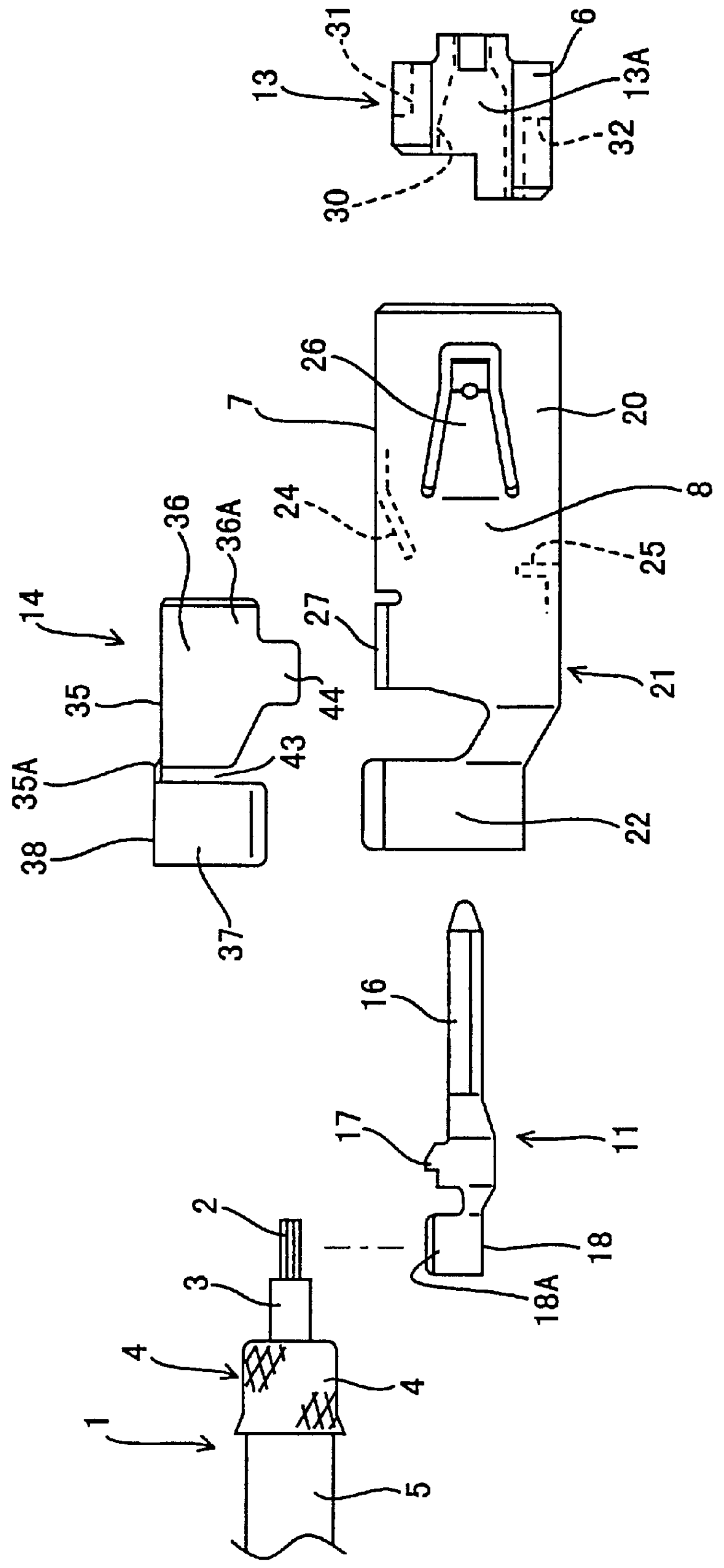
FIG. 2 is an exploded side view of the shielding terminal.
Figure 3:
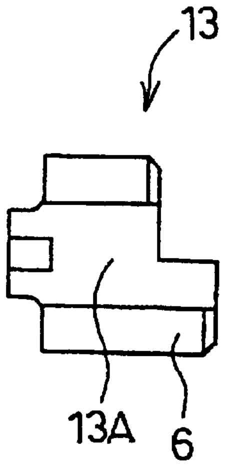
FIG. 3 is a side view of a dielectric element.
Figure 4:
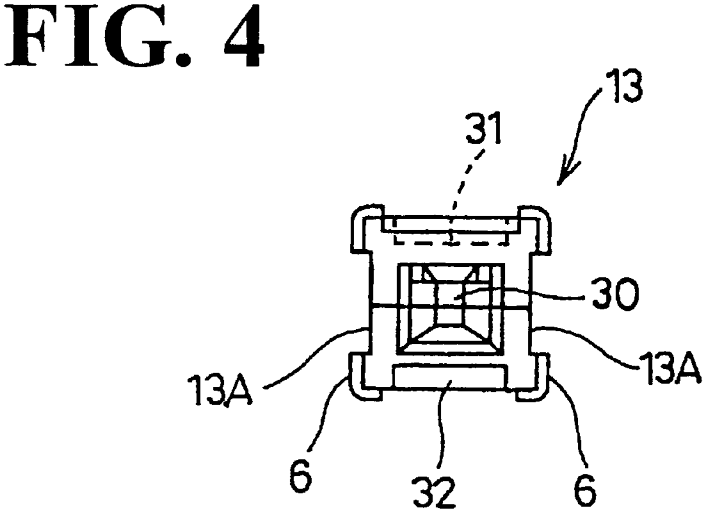
FIG. 4 is a rear view of the dielectric element.
Figure 5:
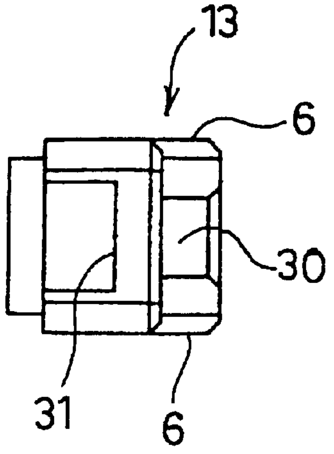
FIG. 5 is a plan view of the dielectric element.
Figure 6:
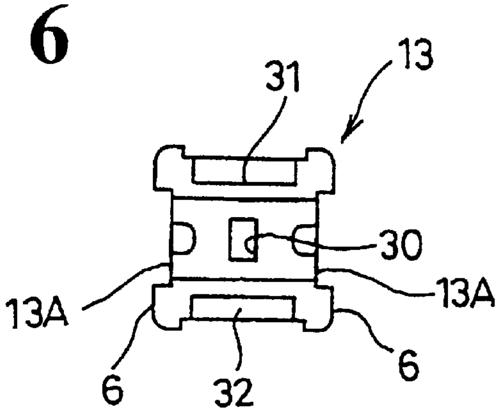
FIG. 6 is a front view of the dielectric element.
Figure 7:
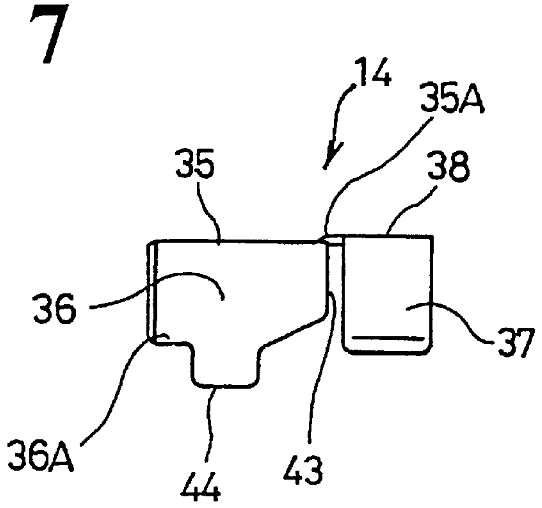
FIG. 7 is a side view of an outer terminal.
Figure 8:
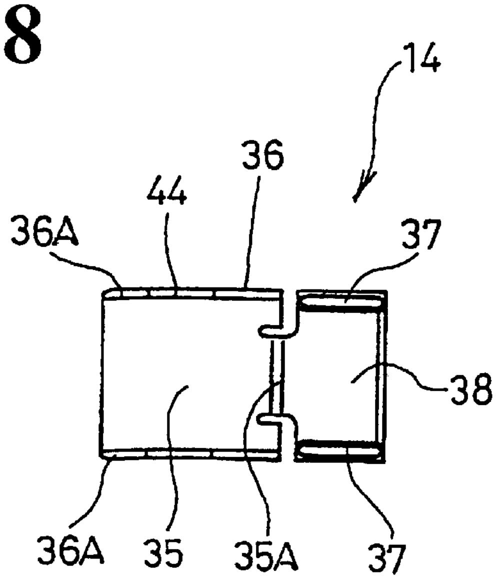
FIG. 8 is a bottom view of the outer terminal.
Figure 9:
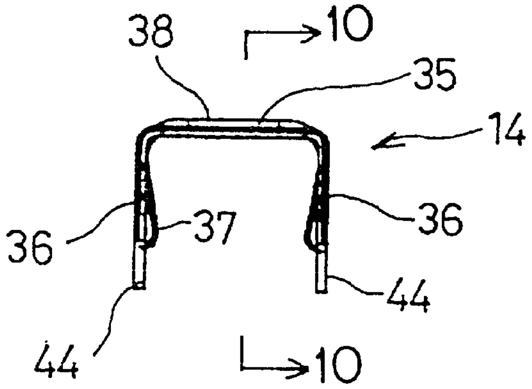
FIG. 9 is a front view of the outer terminal.
Figure 10:
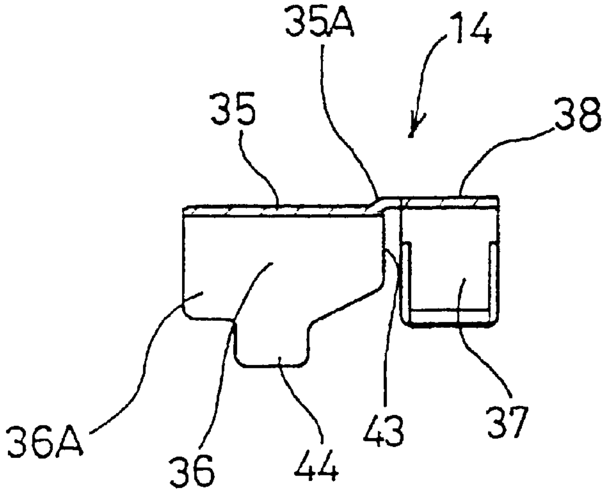
FIG. 10 is a cross-sectional view taken along line 10—10 in FIG. 9.
Figure 11:
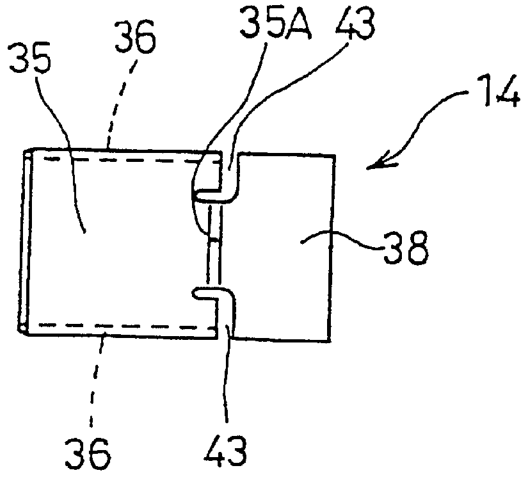
FIG. 11 is a plan view of the outer terminal.
Figure 17:
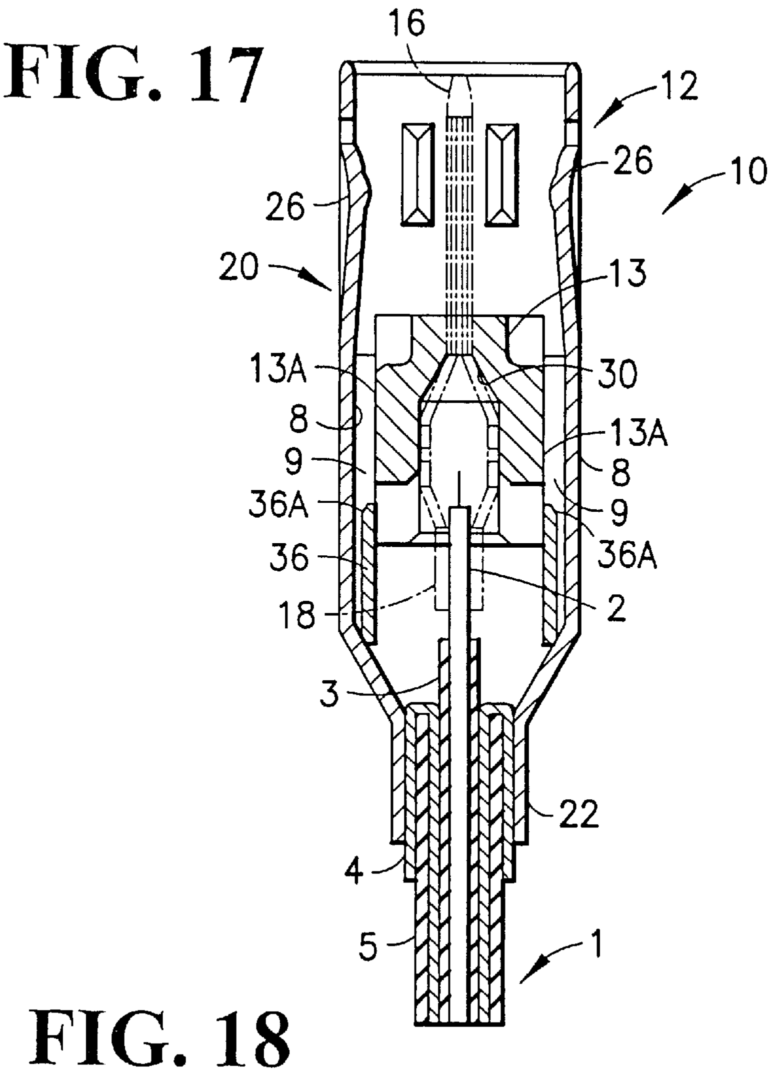
FIG. 17 is a plan view in section of the shielding terminal.
Figure 18:
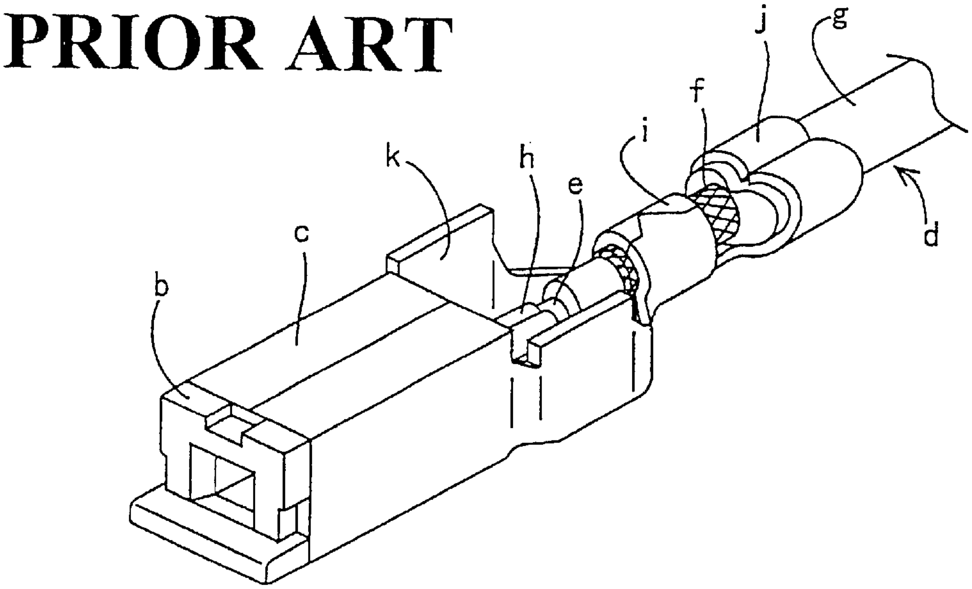
FIG. 18 PRIOR ART
FIG. 18 is a perspective view of a prior art shielding terminal.
Figure 19:
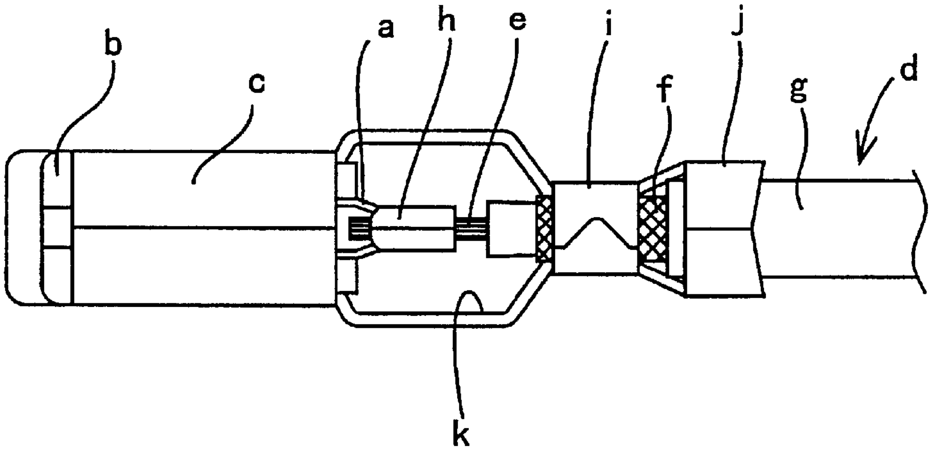
FIG. 19 PRIOR ART
FIG. 19 is a plan view of the prior art shielding terminal.

The shielding cable 1 includes a core 2 formed by bundling a plurality of strands. An insulating layer 3 surrounds the core 2, and a braided wire as a shield layer 4 surrounds the insulating layer 3. Finally, a sheath 5 coaxially surrounds the shield layer 4, as shown in FIGS. 1, 2 and 17. End processing is applied to one end of the shielded cable 1 by stripping an end of the sheath 5 to expose a section of the braided wire 4. At least a part of the exposed section of the braided wire 4 preferably is folded back substantially around the sheath 5, and an end of the exposed insulating layer 3 is cut to expose the core 2.

The shielding terminal 10 is comprised of an inner terminal 11, a dielectric element 13 for accommodating the inner terminal 11, an outer terminal 12 for at least partly accommodating the dielectric element 13, and a cover 14 to be mounted on the outer terminal 12 from above as shown in FIGS. 1 and 2.

The inner terminal 11 is formed into a male terminal e.g. by bending and/or folding a conductive metal plate, and is provided with a tab 16 that can be connected with a mating female inner terminal (not shown). A pair of substantially transversely arranged biting projections 17 are provided substantially adjacent the tab 16 for biting into the inner wall of the dielectric element 13 when the inner terminal 11 is pushed into the dielectric element 13. An inner fastening portion 18 is formed in proximity to the biting projections 17, and is provided for crimped connection with the core 2 of the shielded cable 1. The inner fastening portion 18 includes a pair of fastening pieces 18A, which are open upward before the core 2 is fastened thereto.

The outer terminal 12 also is formed e.g. by bending a conductive metal plate, and is provided at one end with an accommodating portion 20 in the form of a substantially rectangular tube. A covering wall 21 is substantially adjacent the accommodating portion 20, and has an open space 21A formed in its upper surface. An outer fastening portion 22 is substantially adjacent the covering wall 21, and is provided for crimped connection with a folded portion 4A of the braided wire 4 at the end of the shielded cable 1. The accommodating portion 20, the covering wall 21 and the outer fastening portion 22 are arranged in this order from the leading end of the outer terminal 12. Thus, an upper or lateral wall 7 of the outer terminal 12 is terminated at the rear end of the accommodating portion 20, whereas left and right side walls 8 substantially continuously extend from the accommodating portion 20 to the covering wall 21.

The upper wall 7 of the accommodating portion 20 is formed with a metal locking portion 24 for locking the dielectric element 13 and preventing the dielectric element 13 from coming out through the front opening of the accommodating portion 20. The metal locking portion 24 is formed e.g. by cutting a portion of the upper wall 7 of the accommodating portion 20 and bending this cut portion inwardly so as to extend obliquely backward. Further, the bottom wall of the accommodating portion 20 is formed with a stopper 25 for substantially abutting against the rear surface of the dielectric element 13 and substantially preventing the dielectric element 13 from moving backward (see FIG. 2). Furthermore, the left and right side walls of the accommodating portion 20 are formed with contact pieces 26 which can be brought elastically into contact with a mating outer terminal (not shown).

The covering wall portion 21 is closed on three sides by the bottom, left and right walls, and its upper wall is open to act as the open space 21A. The inner fastening portion 18 of the inner terminal 11 is located inside the covering wall portion 21. Upper edges of the left and right side walls of the covering wall portion 21 transversely bulge out, and thereby form stabilizers 27.

The outer fastening portion 22 includes a pair of fastening pieces 22A, which are open upwardly before the shielding terminal 10 is mounted on the shielded cable 1, and thus are similar to the fastening pieces 18A of the inner fastening portion 18.

Figure 13:
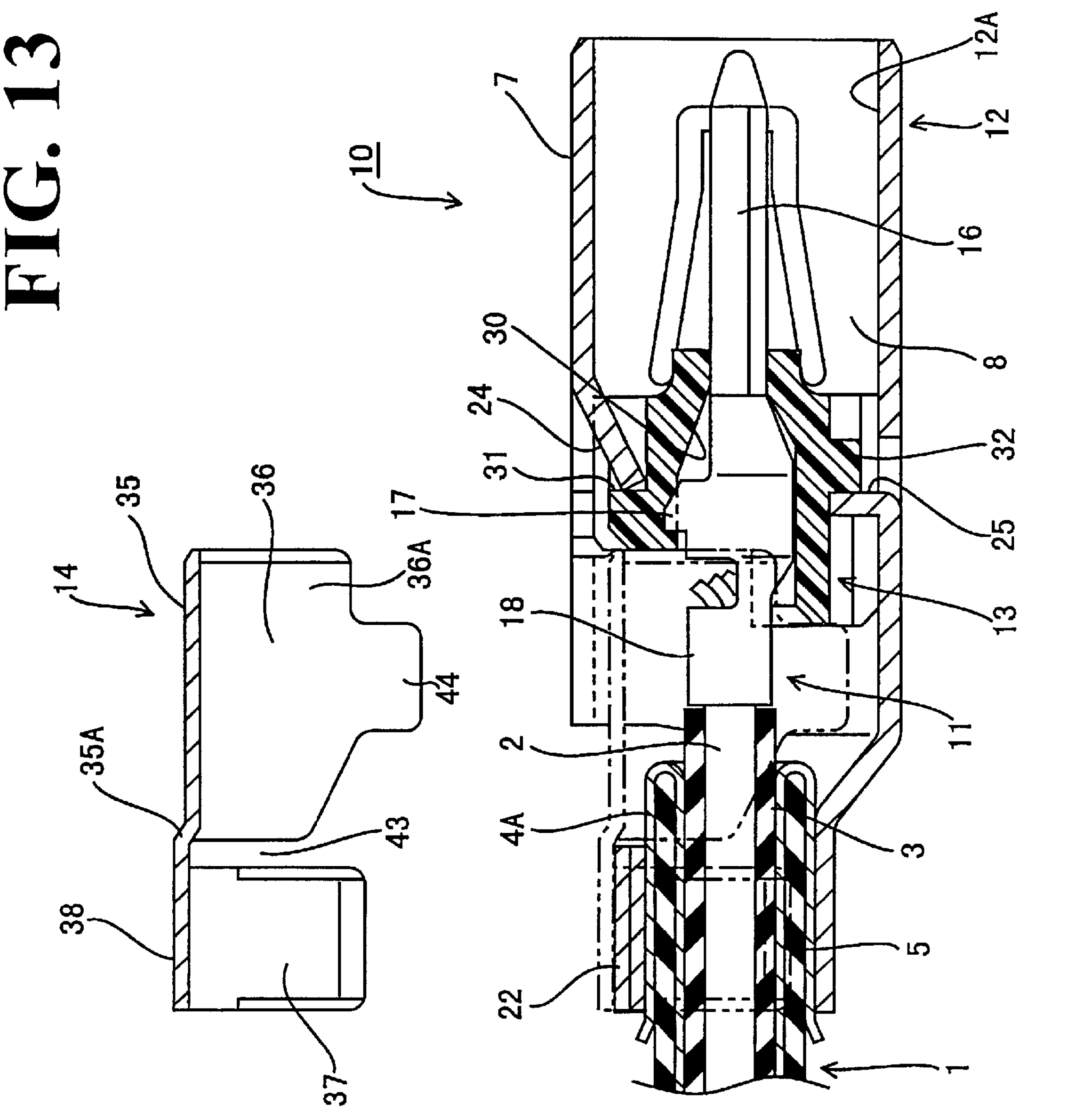
FIG. 13 is a side view in section of the shielding terminal before the cover is mounted.

The dielectric element 13 is made integrally or unitarily of an insulating material, such as a synthetic resin, as shown in FIGS. 3 to 6, and electrically insulates the inner and outer terminals 11, 12 from each other by being mounted therebetween. The dielectric element 13 is inserted at least partly into the accommodating portion 20 of the outer terminal 12, preferably from front, and is fit into a rear end of the accommodating portion 20. An accommodating hole 30 is formed inside the dielectric element 13, and accommodates a portion of the inner terminal 11 preferably from the base end of the tab 16 to the biting projections 17. Thus the tab 16 projects beyond the dielectric element 13 as shown in FIG. 13. A locking hole 31 is formed in the upper surface of the dielectric element 13, and receives the metal locking portion 24 of the outer terminal 12. Additionally, a contact portion 32 is formed in the lower surface of the dielectric element 13, and is brought into contact with the stopper 25 of the outer terminal 12.

Shake-preventing portions 6 project outwardly from the bottom ends of left and right side walls 13A of the dielectric element 13. The shake-preventing portions 6 extend substantially continuously from the front end to the rear end of the dielectric element 13. When the dielectric element 13 is mounted in the outer terminal 12, the shake-preventing portions 6 come substantially into contact with the sidewalls 8, and thereby position the dielectric element 13. At this time, insertion spaces 9 are defined between the sidewalls 13A of the dielectric element 13 and the sidewalls 8 of the outer terminal 12 (see in combination with FIG. 17).

The cover 14 is formed as shown in FIGS. 7 to 11 e.g. by bending a conductive metal plate. The cover 14 has a covering portion 35 for covering an upper or open side of the covering wall 21, a pair of assembling pieces 36 which hang down from the opposite side edges of the covering portion 35 and a pair of mount portions 37. Thus, the cover 14 has a substantially U-shaped cross section.

The covering portion 35 preferably completely covers from the open space 21A in the upper surface of the covering wall 21 of the outer terminal 12 up to the outer fastening portion 22 that is fastened to the shielded cable 1. The covering portion 35 is bent slightly upward in its center position and toward its rear end, thereby forming a crease or dimple or stepped portion 35A. Cuts 43 are made from the opposite side edges of the cover 14 on opposite lateral sides of the crease 35A. Portions of the cover 14 bent downward and located before the cuts 43 serve as the pair of assembling pieces 36, whereas portions of the cover 14 bent downward and located after the cuts 43 serve as the pair of mount portions 37.

A middle portion of the bottom end of each assembling piece 36 further hangs down to form a second displacement restricting portion 44. A portion of the bottom end of each assembling piece 36 before the second displacement restricting portion 44 serves as a displacement restricting portion 36A, which is to be inserted into the corresponding insertion space 9 when the cover 14 is mounted on the outer terminal 12. Further, when the assembling pieces 36A are mounted in their proper positions with respect to the outer terminal 12, the leading ends of the second displacement restricting portions 44 come into contact with the bottom wall 12A of the outer terminal 12.

The mount portions 37 are bent substantially normal and down from opposite lateral ends of a base plate 38 which is slightly above the covering portion 35. The mount portions 37 are elastically deformable in directions toward and away from each other, and tightly hold the outer fastening portion 22 that is crimped or fastened to the shielded cable 1.

The mounting of the shielding terminal 10 on the end of the shielded cable 1 is described below with reference to FIGS. 12 to 17. In particular, end processing, as described above, is applied to the one end of the shielded cable 1. The fastening pieces 18A of the inner fastening portion 18 of the inner terminal 11 then are crimped into connection with the end of the core 2 of the shielded cable 1.

Subsequently, the dielectric element 13 is inserted at least partly into the accommodating portion 20 of the outer terminal 12 from the front. The dielectric element 13 is pushed with sufficient force to deform the metal locking portion 24 elastically. When the contact portion 32 abuts against the stopper 25, as shown in FIG. 13, the metal locking portion 24 is restored to its original shape, and is slipped into the locking hole 31. As a result, the dielectric element 13 is fixed in a specified position at the rear end of the accommodating portion 20.

The inner terminal 11 then is inserted into the accommodating portion 20 of the outer terminal 12, and is maneuvered by a jig inserted through the open space 21A in the upper surface of the covering wall 21 to push the tab portion 16 into the accommodating hole 30 of the dielectric element 13. During this stage, the biting projections 17 bite in the inner walls of the accommodating hole 30. As a result the inner terminal 11 is fixed while the tab 16 projects from the dielectric element 13, as shown in FIG. 13. In this way, the inner terminal 11 is accommodated in the outer terminal 12 via the dielectric element 13. Here, the inner fastening portion 18 of the inner terminal 11 is located in the covering wall 21 of the outer terminal 12, and the folded portion 4A of the braided wire 4 is located in the outer fastening portion 22 of the outer terminal 12.

Next, a crimper crimps the open outer fastening portion 22. Specifically, the two fastening pieces 22A are crimped to surround the folded portion 4A of the braided wire 4, such that the end of one fastening piece 22A is placed on the end of the other fastening piece 22A. In this way, the outer fastening portion 22 fastens the folded portion 4A of the braided wire 4 and the end of the sheath 5. At this time, the left and right surfaces of the crimped outer fastening portion 22 are substantially parallel to each other.

Figure 12:
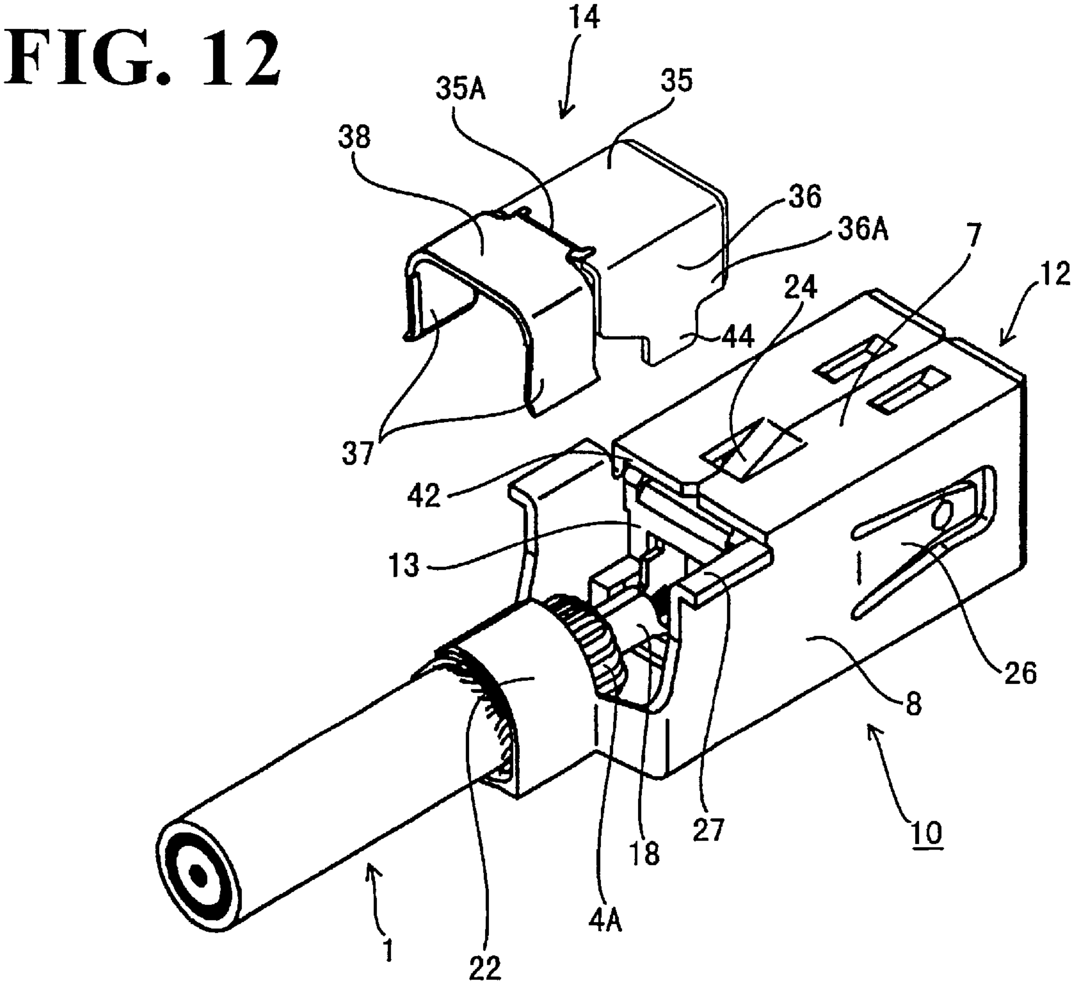
FIG. 12 is a perspective view of the shielding terminal before a cover is mounted.

By the above operation, the inner and outer terminals 11, 12 are mounted on the end of the shielded cable 1 as shown in FIGS. 12 and 13. Even in this state, the shielding terminal 10 sufficiently fulfills its functions and has particular advantages. Specifically, since the braided wire 4 and the sheath 5 are fastened by the single outer fastening portion 22 by folding the braided wire 4 back around the sheath 5, the length of the shielding terminal 10 can be shortened as compared with conventional ones in which the braided wire and the sheath are fastened separately.

Further, the inner terminal 11 is mounted in advance outside the outer terminal 12 and the crimped inner fastening portion 18 is located in the covering wall 21 of the outer terminal 12 to be surrounded on three sides. Consequently, shielding characteristics, such as a radiation characteristic, can be improved as compared with conventional shielding terminals in which both upper and lower surfaces are open.

In this embodiment, the cover 14 is mounted to substantially cover the open space 21A in the upper surface of the covering wall 21 of the outer terminal 12 from an upper or lateral side after the shielded cable 10 is fastened, as described above. At this stage, the two mount portions 37 of the cover 14 are pushed while being elastically widened away from each other by the left and right sides of the outer fastening portion 22, until the base plate 38 contacts the upper ends of the outer fastening portion 22. In this way, the mount portions 37 elastically hold the left and right side surfaces of the outer fastening portion 22 tightly to fix the cover 14.

When the cover 14 is mounted as described above, the covering portion 35 completely covers a portion of the outer terminal 12 from the open space 21A in the upper surface of the covering wall 21 to the outer fastening portion 22. Additionally, the left and right assembling portions 36 substantially cover open rear portions of the left and right side walls 8 of the covering wall 21. As a result, the inner fastening portion 18 of the inner terminal 11 is crimped into connection with the core 2 of the shielded cable 1 and is covered on four sides by the cover 14 and the covering wall 21 of the outer terminal 12.

Figure 14:
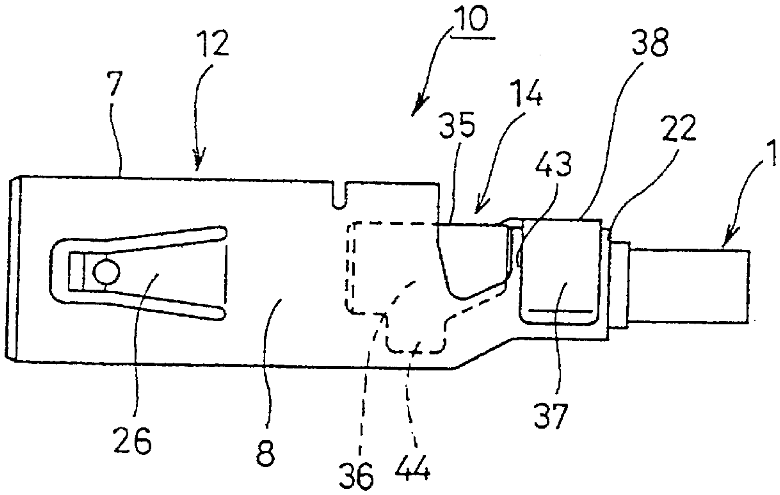
FIG. 14 is a side view of the shielding terminal.
Figure 15:
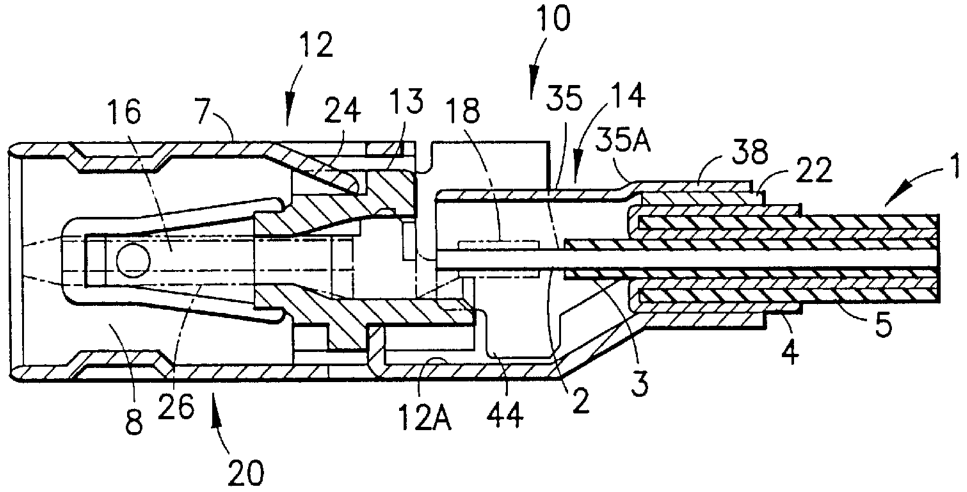
FIG. 15 is a side view in section of the shielding terminal.

Further, the bottom ends of the second displacement restricting portions 44 that extend from the middle of the assembling pieces 36 are in contact with the bottom wall 12A of the outer terminal 12, as shown in FIGS. 14 and 15, and prevent the cover 14 from being displaced.

Figure 16:
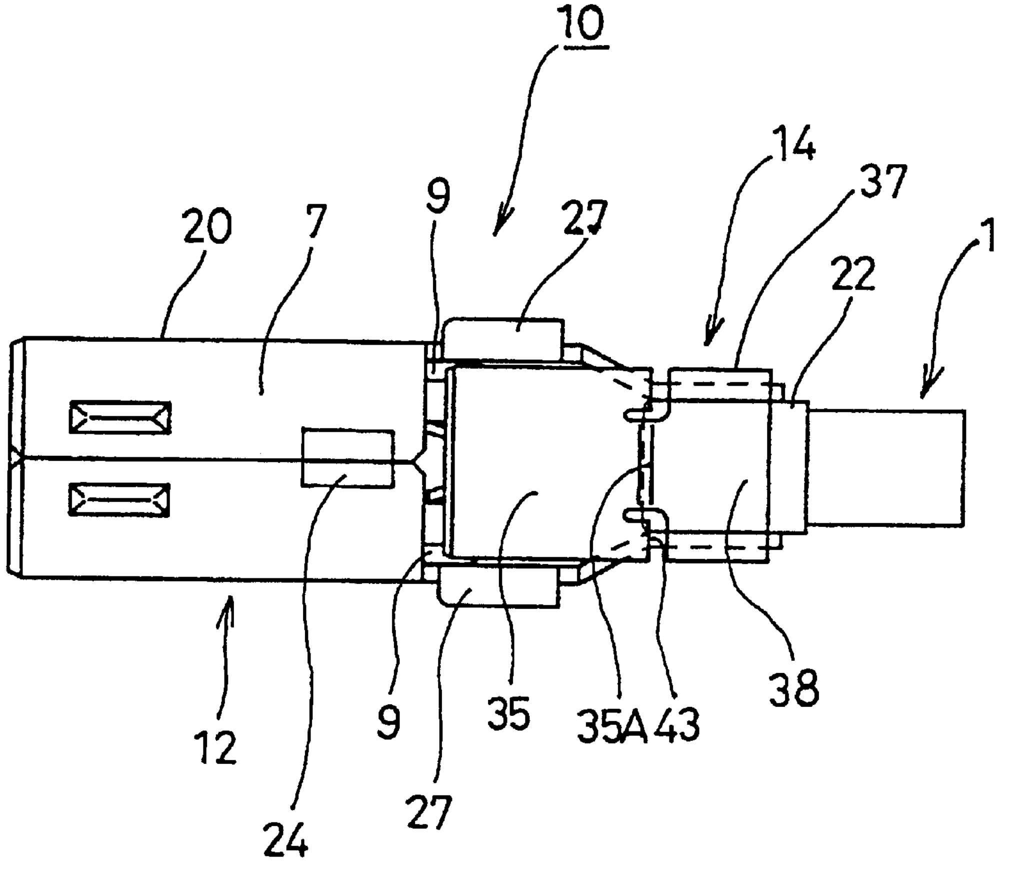
FIG. 16 is a plan view of the shielding terminal.

Furthermore, the assembling pieces 36 are arranged along the side walls 8 of the outer terminal 12 as shown in FIGS. 16 and 17, and the displacement restricting portions 36A of the assembling pieces 36 are inserted into the insertion spaces 9 between the side walls 8 of the outer terminal 12 and the side walls 13A of the dielectric element 13.

According to the foregoing embodiment, the core 2 exposed from the braided wire 4 can have its fastened portion and a portion near it covered on four sides by the cover 14 in addition to the covering wall 21 of the outer terminal 12. Therefore, shielding characteristics, such as a radiation characteristic, can be improved remarkably. As a result, the radiation characteristic of high-frequency signals is improved further by 3 dB to 5 dB as compared with the terminal fittings in which no cover 14 is provided.

Since the cover 14 is mounted on the outer fastening portion 22 of the outer terminal 12 by the mount portions 37, the construction can be simplified without necessitating a separate mounting structure. Further, the mounting operation of the cover 14 can be simplified and the cover 14 can be fitted on the outer terminal 12 without longitudinally bulging out and without changing the outer configuration of the outer terminal 12. As a result, the entire shielding terminal 10 can be made smaller.

In addition, employing a clip-lock construction for the mount portions 37 can securely ground the shielding terminal.

Further, since the second displacement restricting portions 44 of the cover 14 are in contact with the bottom wall 12A of the outer terminal 12, a downward displacement of the cover 14 inside the outer terminal 12 can be restricted.

Furthermore, the displacement restricting portions 36A of the cover 14 are inserted between the side walls 8 and 13, and thereby keep the assembling pieces 36 from being bent inward of the outer terminal 12.

Further, the covering portion 35 of the cover 14 is below the upper wall 7 of the outer terminal 12 as shown in FIG. 14. As a result, a rear edge 42 of the upper surface of the accommodating portion 20 can act as an engaging portion to be engaged with a resin locking portion (not shown) in a cavity of a housing when the shielding terminal 10 is accommodated in the cavity.

The present invention is not limited to the embodiment mentioned above. For example, the following embodiments are also embraced by the technical scope of the present invention as defined in the claims.

Although only the upper wall of the wall covering 21 of the outer terminal 12 is open in the foregoing embodiment, the present invention is also applicable to shielding terminals having such a construction as illustrated in the description of the prior art, i.e. a construction in which both upper and lower surfaces are open where an end of a core is fastened.

Although only the male shielding terminal is illustrated in the foregoing embodiment, the present invention may be applied to female shielding terminals.

Although the cover 14 is provided with the two kinds of displacement restricting portions 36A, 44 in the foregoing embodiment, only one of them may be provided according to the invention.

The shield layer 4 has been described with reference to a braided wire. However, a metal or conductive film also may be used alternatively or additionally for the shield layer 4.

The core 2 may be formed from a single strand or from a plurality of strands, which may be bundled and/or twisted.

What is claimed is:

1. A shielding terminal to be connected with an end of a shielded cable comprised of a core provided substantially in the center of the cable, an insulating layer surrounding the core, a shield layer surrounding the insulating layer, and a sheath surrounding the shield layer, the shielding terminal comprising:

an inner terminal having a fastening portion configured for connection with the core, a dielectric element accommodating at least part of the inner terminal, an outer terminal accommodating the dielectric element and being connectable with the shield layer, the outer terminal being configured for surrounding three sides of the inner terminal and leaving an exposed portion on a fourth side of the inner terminal, and a cover having a covering portion substantially covering the exposed portion on the fourth side of the inner terminal, and at least one mount portion mountable on a section of the outer terminal to be connected with the shield layer, wherein at least one assembling piece is arranged substantially along a side wall of the outer terminal and is formed with at least one displacement restricting portion for restricting displacement of the cover.

2. A shielding terminal according to claim 1, wherein the at least one assembling piece extends from the covering portion of the cover.

3. A shielded terminal according to claim 1, wherein the at least one displacement restricting portion restricts the displacement of the cover by being held substantially in contact with a connecting wall that connects with the side wall of the outer terminal, the connecting wall being a bottom wall of the outer terminal.

4. A shielding terminal according to claim 3, wherein each displacement restricting portion comprises a first displacement restricting portion that is held in contact with the side wall of the outer terminal and a second displacement restricting portion that is held in contact with the connecting wall.

5. A shielding terminal according to claim 4, wherein two displacement restricting portions and two side walls are provided, the displacement restricting portions being inserted between the side walls of the outer terminal and side walls of the dielectric element.

6. A shielding terminal according to claim 5, wherein the displacement restricting portions prevent the assembling pieces from being bent inward of the outer terminal.

7. A shielding terminal according to claim 6, wherein the at least one mount portion comprises a clip-lock.

8. A shielding terminal according to claim 1, wherein the exposed portion of the inner terminal comprises the fastening portion.

9. A shielding terminal according to claim 1, wherein portions of the cover at the exposed portion of the inner terminal define a spacing from the inner terminal that is less than a spacing between the outer terminal and the inner terminal adjacent the exposed portion, such that the outer terminal defines an engaging edge for engaging a locking latch.

10. A method for connecting a shielding terminal with an end of a shielded cable, the shielded cable comprising a core provided substantially in the center of the cable, an insulating layer surrounding the core, a shield layer surrounding the insulating layer, and a sheath surrounding the shield layer, the method comprising the steps of:

connecting an inner terminal with the core, at least partly accommodating the inner terminal in a dielectric element, at least partly accommodating the dielectric element and the inner terminal in an outer terminal such that three sides of the inner terminal are surrounded by the outer terminal and such that an exposed portion is defined on a fourth side of the inner terminal, connecting the outer terminal with the shield layer, and substantially covering the exposed portion of the inner terminal connected with the core with a cover, wherein the covering step comprises:

mounting at least one mount portion of the cover on a section of the outer terminal connected with the shield layer, and arranging at least one assembling piece substantially along a side wall of the outer terminal for restricting a displacement of the cover.

11. A method according to claim 10, wherein the covering step further comprises a step of bringing at least one displacement restricting portion into contact with a connecting wall substantially connecting the side walls of the outer terminal.

* * * * *